United States Patent [19]

Mathieson et al.

[11] 4,270,792
[45] Jun. 2, 1981

[54] MOLDING ASSEMBLY

[75] Inventors: John N. Mathieson, Romeo; Roy C. Spranger, Warren, both of Mich.

[73] Assignee: General Motors Corporation, Detroit, Mich.

[21] Appl. No.: 100,498

[22] Filed: Dec. 5, 1979

[51] Int. Cl.³ .............................................. B60J 1/00
[52] U.S. Cl. ........................................ 296/93; 49/490;
    52/400; 296/84 D
[58] Field of Search .................. 296/84D, 93; 49/490,
    49/475, 498, 489, 500; 52/400, 208

[56] References Cited

U.S. PATENT DOCUMENTS

| | | | |
|---|---|---|---|
| 3,093,844 | 6/1963 | Brock et al. | 296/93 X |
| 3,155,472 | 11/1964 | Campbell et al. | 296/93 |
| 3,189,143 | 6/1965 | Adams | 296/93 |
| 3,705,470 | 12/1972 | Kent | 296/93 X |
| 3,879,241 | 4/1975 | Butler | 296/84 D X |
| 4,035,017 | 7/1977 | Griffin et al. | 296/93 |
| 4,067,155 | 1/1978 | Ruff et al. | 52/105 |
| 4,123,100 | 10/1978 | Ellis | 296/93 |
| 4,165,119 | 8/1979 | Hadeen et al. | 296/93 |
| 4,193,605 | 3/1980 | Josephson | 296/93 X |

*Primary Examiner*—Robert R. Song
*Assistant Examiner*—Norman L. Stack, Jr.
*Attorney, Agent, or Firm*—Saul Schwartz

[57] ABSTRACT

An improved molding assembly for a vehicle having a window opening with a flange in the plane of the opening and a window in the opening parallel to the plane thereof but spaced therefrom by a gap, the assembly including a wire carrier having anchoring tangs encapsulated in a decorative body and retention tangs projecting from the body and a bead of cured material in the gap retaining the window on the body. The wire carrier is mounted on the flange with the body overlying the gap and the retention tangs and anchoring tangs gripping the flange. The retention tangs are disposed in the gap and the cured material is flowed through and around interstices in the tangs to encapsulate at least a portion of the tangs in the cured material to retain the carrier and the body on the flange.

3 Claims, 4 Drawing Figures

MOLDING ASSEMBLY

FIELD OF THE INVENTION

This invention relates generally to window installations for automotive vehicles and, more particularly, to an improved decorative molding assembly for use in such installations.

In typical automobile or like vehicles bodies, metal panels defining a window opening terminate at the opening in flanges which provide a rigid surface on which to support the window glass. Further, the glass is typically positively retained in the opening by attaching means at the flanges and numerous systems exist or have been proposed for this purpose. Finally, for aesthetic and other reasons, some type of molding is usually provided to conceal the edges of the flanges and the glass and the glass attaching arrangement. This invention is concerned primarily with an interior decorative molding assembly having improved retention characteristics along with manufacturing and assembly simplicity.

SUMMARY OF THE INVENTION

The primary feature of this invention is that it provides an improved molding assembly for automobile or like vehicle bodies. Another feature of this invention is that it provides an improved molding assembly especially adapted for decorative concealment of the peripheral edge of and associated attachment means for a vehicle window. Still another feature of this invention resides in the provision of a decorative molding assembly including a decorative molding strip adapted for improved retention on the vehicle body along with ease of manufacture and assembly. A still further feature of this invention resides in the provision of a decorative molding strip fabricated of flexible plastic material, such as vinyl, having partially encapsulated therein a preformed wire carrier, the exposed portion of the wire carrier cooperating with the encapsulated portion in gripping the body flange around the window opening while also defining a plurality of retention tangs adapted to be encased in curable adhesive disposed between and body and the window glass for retention of the latter on the former. These and other features of this invention will be readily apparent from the following specification and from the drawings wherein:

DESCRIPTION OF THE PREFERRED EMBODIMENT

Figure 1:
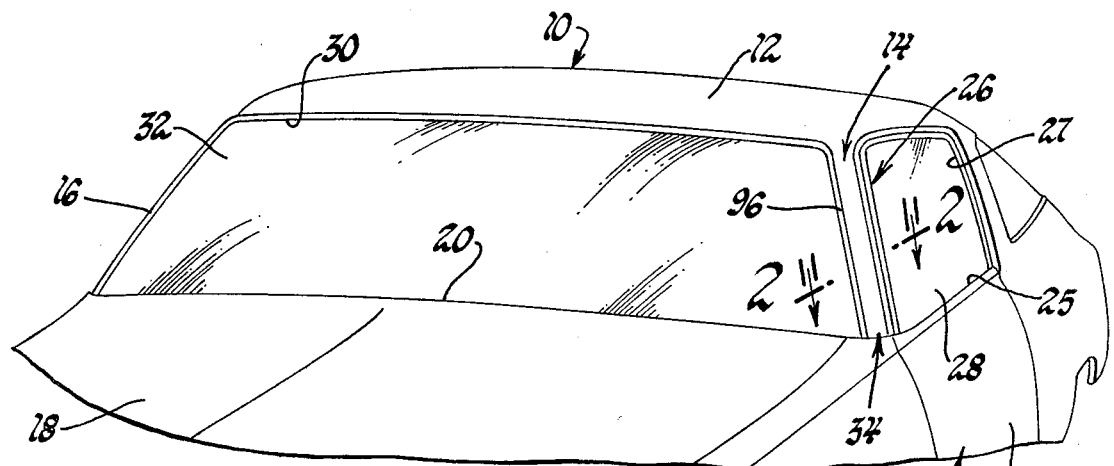
FIG. 1 is a partial view of an automobile vehicle body, in front perspective, having a decorative molding assembly according to this invention.

Referring now to FIG. 1 of the drawings, there shown is an automobile vehicle body designated generally 10, including a roof structure 12, a left front pillar 14, a right front pillar 16, and a hood 18 terminating in a cowl structure 10. The body 10 further includes a left door assembly 22 swingably mounted on the body for movement between a closed position, shown on FIG. 1, and an open position not shown. The door assembly 22 includes a lower panel 24 having an upper edge 25 defining the belt line of the body and an inverted U-shaped frame structure 26 defining, with the edge 25, a window opening 27 in which is supported by conventional means for vertical bodily shiftable movement a glass panel 28. The roof structure 12, the left and right pillars 14 and 16, and the cowl structure 20 cooperate in generally defining a window opening 30 in which is supported, as described hereinafter, a fixed window panel or windshield glass 32.

Figure 2:
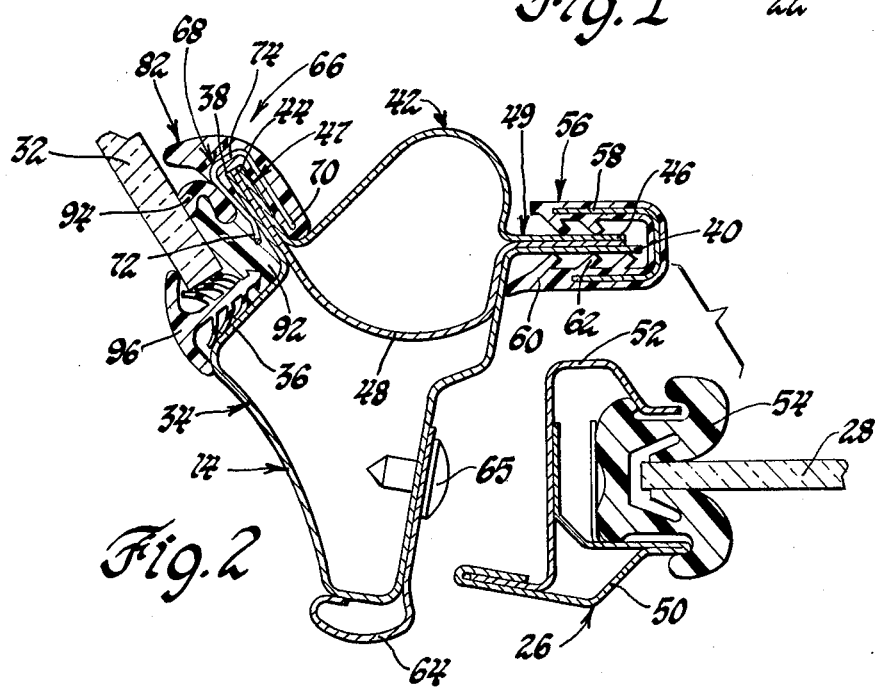
FIG. 2 is a cross sectional view taken generally along the plane indicated by lines 2—2 in FIG. 1.

As seen best in FIG. 2, the outer surface of the pillar 14 is defined by a formed outer panel 34 having on one side thereof an inwardly extending wall portion 36 and a flange 38 extending from the wall portion 36 generally in the plane of the window opening 30. On the side opposite the wall portion 36 and flange 38, the outer panel 34 has formed thereon another flange 40. The pillar 14 further includes a formed inner panel 42 having a flange 44 corresponding generally to the flange 38 on the outer panel and a flange 46 corresponding generally to the flange 40 on the outer panel. An intermediate panel 48 is disposed between the inner and outer panels inside the pillar 14 and all three panels are pinch welded together at the flanges to form a rigid pillar having a composite flange 47 along one edge and a composite flange 49 along the outer edge. The composite flange 47 defines the left vertical edge of the window opening 30 and cooperates with similar flanges on the right pillar 16, the roof structure 12 and the cowl structure 20 in defining all four edges of the window opening.

Referring again to FIG. 2, in the closed position of the door 22 the frame structure 26 is disposed adjacent the pillar 14. The frame 26 includes an outer panel 50 and an inner panel 52 rigidly attached by conventional means. The panels 50 and 52 cooperate in supporting a conventional window guide and seal 54 which receives the glass panel 28 and supports the latter for conventional vertical sliding movement while preventing, in the closed position of the window shown in FIG. 1, the intrusion of the elements into the interior of the vehicle body.

Referring still to FIG. 2, the composite flange 49 on pillar 14 is concealed behind a decorative molding 56 of conventional design which forms no part of this invention. Generally, the molding 56 includes a U-shaped wire carrier 58 encased in a flexible plastic body 60 having a plurality of integral inwardly extending fingers 62. The molding 56 slides over the composite flanges 49 and is retained thereon by the fingers 62 which resiliently grip the flange. Also in a conventional manner, decorative trim strip 64 is fastened to the outer panel 34 of the pillar 14 by a plurality of snap fasteners, indicated at 65, concealed between the pillar and the frame structure 26.

Figure 3:
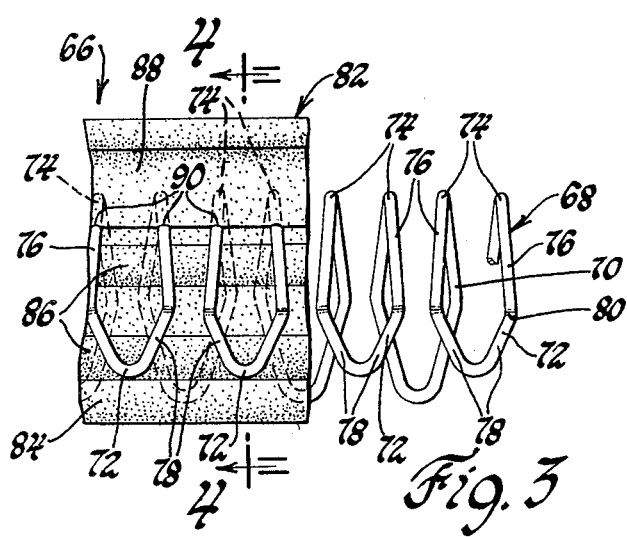
FIG. 3 is an enlarged partially broken away view of a section of decorative molding according to this invention showing the wire carrier and the plastic body of the molding.
Figure 4:
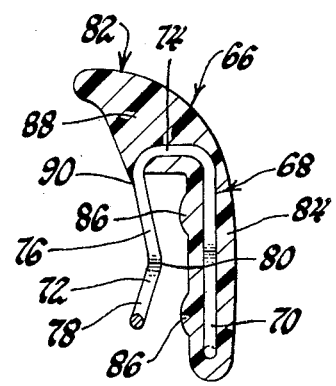
FIG. 4 is a cross sectional view taken generally along the plane indicated by lines 4—4 in FIG. 3.

Referring now to FIGS. 2, 3 and 4, the composite flange 47 on pillar 14 is concealed by a decorative molding assembly according to this invention designated generally 66. The molding assembly 66 includes a wire carrier 68 preformed to define a plurality of generally coplanar anchoring tangs 70 and a corresponding plurality of retention tangs 72. Each of the retention and anchoring tangs is generally U-shaped in configuration, FIG. 3, and the spaces or interstices between the sides of each tang and between tangs is adapted, as described hereinafter, to permit flow of a liquid medium through and around the carrier member. The retention tangs are disposed in alternate spaced relationship with respect to the anchoring tangs lengthwise along the wire carrier and are spaced laterally with respect to the plane of the anchoring tangs, FIG. 4, by a preselected distance. The retention tangs are attached to the anchoring tangs by short bridge sections 74 of the wire carrier which impart to the retention tangs 72 a desired amount of resiliency with respect to the anchoring tangs 70 and which maintain the retention tangs at the preselected spacing when unstressed. For a purpose more fully described hereinafter, each of the retention tangs 72 has a first portion 76 projecting toward the plane of anchoring tangs 70 and a second portion 78 projecting away from the plane of anchoring tangs 70, and first and second portions being connected at an elbow 80, FIG. 4. The molding assembly 66 further includes a decorative plastic body 82 encasing a portion of the wire carrier 68. The body 82 may be fabricated from known materials used in this type of application, as for example, extruded vinyl. The body 82 has a first portion 84 which completely encases the anchoring tangs 70 and defines a pair of axially extending ribs 86. The first portion 82, of course, during the extrusion or fabricating process, is flowable and is forced to completely fill the interstices defined by the anchoring tangs 70 so that the latter are firmly attached or anchored to the body portion 82 when the plastic hardens or cures. The body 82 further includes a second portion or web 88 which completely encases the bridge sections 74 of the wire carrier and from which the retention tangs 72 project as at 90, FIGS. 3 and 4.

Describing now the installation of the molding assembly 66 and referring specifically to FIG. 2, prior to installation of the window panel 32 on the vehicle body, the molding assembly 66 is mounted on the composite flange 47 with ribs 86 contacting the inside or body interior surface of the composite flange and the elbows 80 of the retention tangs 72 contacting the outside surface of the flange. The lateral spacing of the retention tangs from the anchoring tangs on the wire carrier member is preselected to be less than the thickness of the composite flange so that the molding assembly is self supporting on the composite flange when the tangs are flexed by being pressed over the flange. Further, the outward projecting orientation of the second portions 78 of the retention tangs 72 provides an entrance angle for the composite flange which allows the molding assembly to be quickly and easily mounted on the flange.

Prior to installation of the window panel 32 on the body, a bead 92 of curable adhesive material and a rubber dam member 94 are applied to the inside surface of the window adjacent its peripheral edge. The window panel 32 is then transported to the window opening 30 on the body and placed therein so as to be located in a plane spaced by a relatively narrow gap from the plane of the window opening defined by composite flange 47 and the corresponding flanges on the other panels defining the window opening, FIG. 2. The gap is narrow enough to spread or flow the bead of curable material 92 through and around the interstices between the retention tangs 72 and against the outer surface of flange 38, the dam 94 controlling the outward flow of the material. The curable material 92 thus encapsulates at least the distal ends of each of the retention tangs 72, FIG. 2, and the web of the body 82 overlies the gap between the window and the flange.

The curable adhesive material is preferably a polysulfide base material having suitable fillers and solvents added. When cured, this material exhibits the properties of rubber in that it is capable of accepting shear stress, will not crack or corrode in various climates, and will wet both glass and painted metal to assure a continuous bond between the window panel 32 and the flange 38 of the outer panel 34. After curing, the retention tangs 72 are firmly encased in the bead 92 for positive retention on the pillar 14. To complete the window installation, a molding strip 96 is disposed in the space between the edge of the window 32 and the inwardly extending wall portion 36 of the outer panel 34. A molding strip suitable for this purpose is disclosed in U.S. Pat. No. 4,165,119 issued on Aug. 21, 1979 and assigned to the assignee of this invention.

The embodiments of the invention in which an exclusive property or privilege is claimed are defined as follows:

1. In a vehicle body having a window opening of predetermined planar configuration with a flange disposed in said plane and a window panel having a planar configuration corresponding to said plane of said window opening and disposed in said opening parallel to said plane but spaced therefrom by a gap, an improved molding assembly comprising: a decorative body portion, carrier means having a first portion encapsulated in said body portion and a second portion projecting from said body portion, said carrier means being disposed on said flange with said second portion being located in said gap and said first and said second portions straddling said flange thereby to mount said body portion adjacent said window opening, and a bead of cured material in said gap between said window panel and said flange operative to retain said window panel on said body and to encapsulate a part of said second portion of said carrier means thereby to retain said carrier means and said body portion on said flange.

2. In a vehicle body having a window opening of predetermined planar configuration with a flange disposed in said plane and a window panel having a planar configuration corresponding to said plane of said window opening and disposed in said opening parallel to said plane but spaced therefrom by a gap, an improved molding assembly comprising: a wire carrier member preformed to include an anchoring tang defining a plane and a retention tang spaced laterally from said plane; said retention tang defining interstices into which a fluid medium can flow, a decorative body formed over said wire carrier portion and encapsulating said anchoring tang to positively connect said body and said wire carrier while leaving said retention tang exposed, said connected body and wire carrier being mounted on said body panel flange with said flange being captured between said exposed retention tang and said encapsulated anchoring tangs and with said retention tang being disposed in said gap and said body overlying said gap, and a bead of cured adhesive material in said gap between said window panel and said flange operative to retain said window panel on said body and mold formed about said retention tang and through said interstices thereof thereby to retain said carrier member and said decorative body on said flange.

3. In a vehicle body having a window opening of predetermined planar configuration with a flange disposed in said plane and a window panel having a planar configuration corresponding to said plane of said window opening and disposed in said opening parallel to said plane but spaced therefrom by a gap, an improved molding assembly comprising: a wire carrier member preformed to include a plurality of anchoring tangs defining a plane and a plurality of retention tangs connected to said anchoring tangs by a plurality of bridge sections, said bridge sections being adapted to resiliently urge said retention tangs toward a free position spaced a preselected lateral distance from said first plane, each of said retention tangs and said anchoring tangs being generally U-shaped to define a plurality of interstices into which a fluid medium can flow and each of said retention tangs having a portion diverging from said plate thereby to define an entrance angle, a decorative body formed over said wire carrier and completely encapsulating said anchoring tangs and said bridge sections thereby to positively connect said body and said wire carrier while leaving said retention tangs exposed, said connected body and wire carrier being mounted on said flange with the latter being captured between said exposed retention tangs and said encapsulated anchoring tangs and with said retention tangs being disposed in said gap and said body overlying said gap, said connected body and wire carrier being retained on said flange by the resilient force of said bridge section developed by spreading said retention tangs and said anchoring tangs to capture said flange, and a bead of cured adhesive material in said gap between said window panel and said flange operative to retain said window panel on said body and mold formed about said retention tangs and through said interstices thereof thereby to retain said carrier member and said decorative body on said flange.

* * * * *